United States Patent [19]

Milnes et al.

[11] Patent Number: 4,980,618

[45] Date of Patent: Dec. 25, 1990

[54] MICROCONTROLLER BASED AUTOMATIC DOOR OBSTRUCTION DETECTOR

[75] Inventors: Robert D. Milnes; Gioacchino A. Mutone, both of Pittsburgh, Pa.

[73] Assignee: AEG Westinghouse Transportation Systems, Pittsburgh, Pa.

[21] Appl. No.: 385,195

[22] Filed: Jul. 26, 1989

[51] Int. Cl.$^5$ .............................................. H02J 3/00
[52] U.S. Cl. ..................................... 318/265; 318/286
[58] Field of Search ............................. 318/280–286, 318/466, 265, 266, 461, 463, 467, 275, 626, 651, 652; 388/806, 810, 820, 822, 904; 49/26, 28

[56] References Cited

U.S. PATENT DOCUMENTS

| | | | |
|---|---|---|---|
| 3,525,918 | 8/1970 | Parnell | 318/286 X |
| 4,234,833 | 11/1980 | Barrett | 318/286 X |
| 4,259,625 | 3/1981 | Hatakeyama et al. | 318/283 X |
| 4,338,552 | 7/1982 | Pilz et al. | 318/286 X |
| 4,468,596 | 8/1984 | Kinzl et al. | 318/286 X |
| 4,491,775 | 1/1985 | Harvey et al. | 318/286 X |
| 4,563,625 | 1/1986 | Kornbrekke et al. | 318/283 X |
| 4,713,591 | 12/1987 | McCloskey | 318/286 X |
| 4,736,144 | 4/1988 | Chun-Pu | 318/286 X |

FOREIGN PATENT DOCUMENTS 2239803 6/1973 France .................................. 318/286

Primary Examiner—William M. Shoop, Jr.
Assistant Examiner—A. Jonathan Wysocki
Attorney, Agent, or Firm—Spencer & Frank

[57] ABSTRACT

A microprocessor controlled automatic door opener including means for detecting the velocity and direction of travel of the door. The microcontroller evaluates detected changes in either the velocity or direction of travel to determine the cause, and either reverses door travel direction or ignores the detection.

6 Claims, 2 Drawing Sheets

MICROCONTROLLER BASED AUTOMATIC DOOR OBSTRUCTION DETECTOR

BACKGROUND OF THE INVENTION

The present invention relates to mechanisms for automatically opening and closing doors. More particularly, the present invention relates to a microcontroller system utilized to control the mechanism for opening and closing a door which senses an obstruction in the path of the moving door and reacts thereto.

Microcontrollers are often utilized to control a mechanism which automatically opens and closes a door. Power is normally supplied to an electric motor which is mechanically linked to the door mechanism to propel the door in an open or closed direction. The supply of power to the electric motor can be regulated by a microcontroller. The microcontroller will regulate the opening and closing speed and the direction of door travel depending upon a preprogrammed sequence. Generally, a door operated in such a manner will follow a preprogrammed velocity profile in both the opening and closing sequence.

FIG. 3 shows a graph which illustrates a representative example of a standard velocity profile for an automatically opened or closed door where the parameters on the horizontal and vertical axes have the followings:

The graph in FIG. 3 illustrates how a door starts at a stationary or the minimum velocity, quickly accelerate to a maximum velocity (Vmax) and maintains this velocity throughout the travel from the closed to the fully open position. Once in the fully opened position the velocity drops immediately down to the minimum again. This sequence is also repeated for the closing of the door where the door starts at rest position quickly accelerates to maximum velocity and then returns to rest position upon full closure.

When the door is travelling at maximum velocity either opening or closing, it can encounter obstructions which are unknowingly placed in the path of travel of the door. When a door encounters such obstructions, damage can result to the door, to the obstruction or to both. Therefore, means must be provided for stopping the travel of the door and or reversing such travel if necessary and/or to minimize potential damage.

Further, changes in the travelling velocity of the door can also result from non-obstruction sources. Factors within the door mechanism itself such as friction, mechanical wear, power supply disturbances, drive mechanism irregularities and the like, can cause the door to experience acceleration or deceleration during its travel. It is important that the door control mechanism is able to differentiate between these internal factors and external obstructions. The mechanism must not respond to any of these internal factors as if they were obstructive interference. If the control mechanism were to so react, the door will be stopped and/or reversed unnecessarily.

BRIEF SUMMARY OF THE INVENTION

It is an object of the present invention to provide a door control mechanism which is capable of sensing and distinguishing between obstructive interference and inherit mechanical interference.

It is another object of the present invention to provide a control mechanism which senses and relies upon the door movement velocity for detecting irregularities in automatic door movement and attributing such irregularities to obstructive interference or inherent interference.

These and other objects of the present invention are accomplished through the provision of an automatic door controlling microcontroller system which monitors the speed of travel of the automatic door, analyzes any change in the rate of travel or deviation of the rate of travel from the expected rate of travel or specified rate of travel and determines from an analysis of the speed difference whether the door is experiencing an obstruction or an inherent mechanical interference. Further, the controller is designed to respond to such determination by either stopping and/or reversing the travel of the automatic door, or ignoring the velocity disruption.

BRIEF DESCRIPTION OF THE FIGURES

The invention will now be described with references to the following drawings illustrating an exemplary embodiment thereof.

DETAILED DESCRIPTION OF AN EXEMPLARY EMBODIMENT

Figure 1:
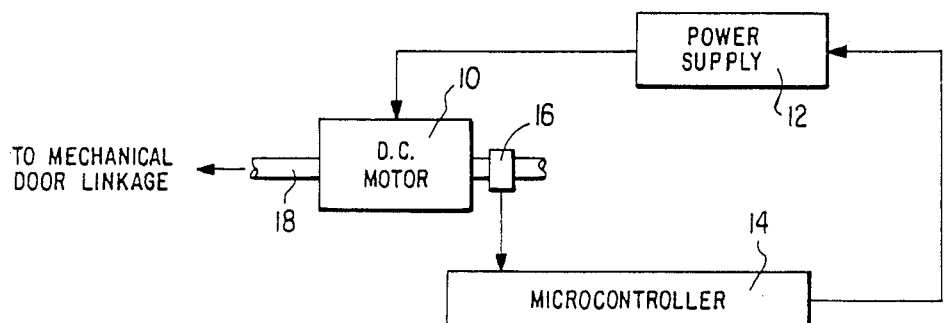
FIG. 1 block diagram illustrating the interconnection of the drive motor and the controlling mechanism.

FIG. 1 illustrates a motor 10 which is connected via a mechanical linkage to a door opening mechanism not illustrated. Power supply 1 is utilized to drive the DC motor 10 in either the clockwise or counter clockwise direction to open or close the door. Microcontroller 14 controls the application of power to the DC motor through controlling power supply 12. A shaft position encoder 16 is provided to sense the direction and rotational speed of the shaft of the DC motor 10. The encoder 16 supplies a signal to the microcontroller 14 in the form of encoder pulses indicating the velocity and direction of rotation of the motor shaft 18, so that the microcontroller 14 can control the power supply 12 to regulate the DC motor 10 based upon its rotational speed and direction.

Figure 3:
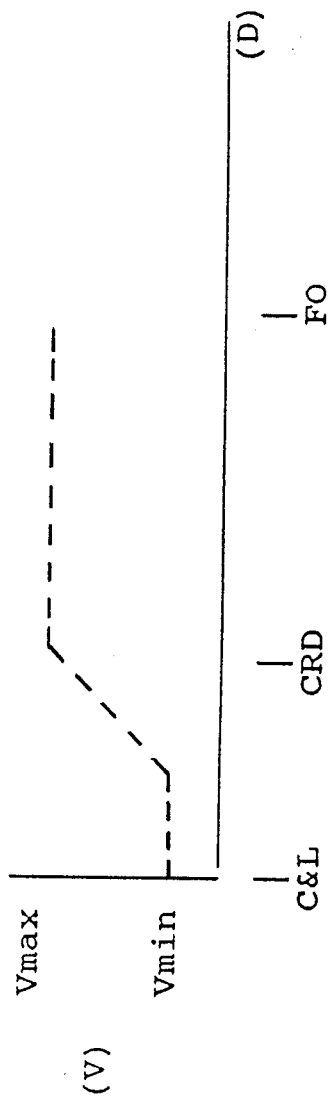
FIG. 3 is a graph illustrating a velocity profile for an automatically controlled door.

As illustrated in FIG. 3, the door is expected to exhibit a velocity profile wherein it starts at a minimum velocity (Vmin) and accelerates rapidly to a maximum velocity (Vmax) which is sustained throughout the majority of its travel. When the door is in the fully open or fully closed position and the door is desired to be opened or closed, the microcontroller is commanded by the door operator to begin a close or open operation. Power is then supplied to the motor 10 in an attempt to operate the doors to move at Vmax. Since the door is initially at zero velocity, a certain lag time will be necessary to accelerate the door to Vmax. An error is therefore detected between the actual door velocity and the desired or specified door velocity. After several inches of travel the door reaches Vmax and a near steady constant velocity condition is achieved. As the door continues to travel at Vmax, the actual or detected velocity is approximately equal to the desired specified velocity.

When the maximum velocity is attained, power is reduced as less power to motor 10 is required to maintain velocity than required to accelerate to maximum velocity from rest position. At this point a second error is created between the actual velocity and the specified velocity. These velocity errors during acceleration and the point of reaching maximum velocity are corrected through the use of a control algorithm within the microcontroller that increases or decreases the power to motor 10 depending upon the error factor and the position of travel along the velocity acceleration profile.

While at maximum velocity, an automatic door can encounter many conditions that may cause it to deviate from the desired maximum velocity. Friction, mechanical wear, power supply inconsistencies, as well as other inherent mechanical factors can effect the door travel velocity. Also, external factors such as obstructions in the door path can effect the door movement velocity. For instance, if there is sudden increase in friction during a certain part of the door travel, the door velocity can decrease when the door mechanism encounters this portion of travel. In extreme cases, the door can actually be stopped by internal mechanical difficulties.

External obstructions can include people or objects placed in the path of the travelling door. These obstructions can slow down or stop the door travel. If the power to the motor is not also stopped or reversed, significant damage can result to the door mechanism, the obstruction or both.

Figure 2:
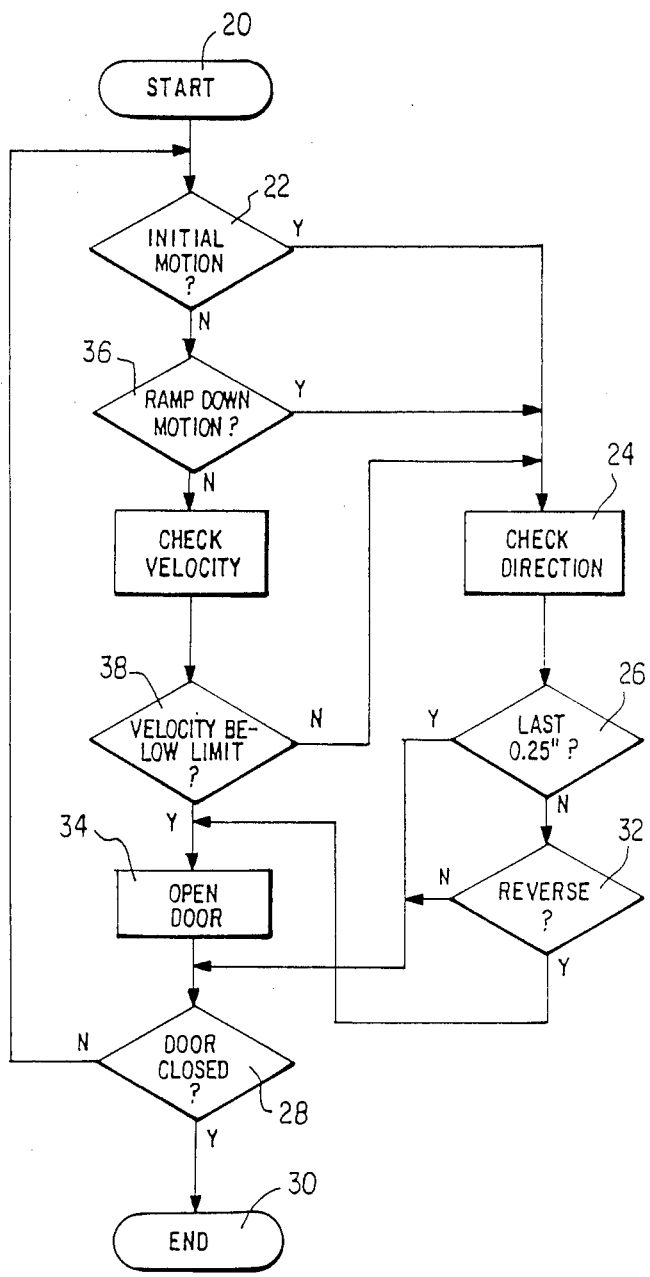
FIG. 2 is a flow chart illustrating the logical operation of the drive controller.

The logical operation of the present invention, as illustrated in FIG. 2, provides an effective means for detection of a change in velocity of the door travel. Also, the present invention provides for analysis of the reason for the change in velocity whether it is from internal mechanical inconsistencies or from external obstruction of the door travel. Detection of stalling friction or other internal velocity effecting factors will not result in stopping or reversal of the motor 10. However, detection of an obstruction in the travel path of the door will result in termination of power to the DC motor or in reversal of power thereto.

In order to effectively detect obstructions, the microcontroller 14 utilizes the feedback from shaft encoder 16 to determine door position, direction of movement and velocity. Two methods of obstruction detection are implemented by the microcontroller 14, the first method utilizes door velocity and changes therein, and the second method utilizes changes in the door travel direction to indicate obstruction and to make the necessary control implementation.

When utilizing the velocity decrease obstruction detection method, the encoder 16 sends a number of pulses to microcontroller 14 for every rotation of the motor shaft 10. Since the rotation of the motor 10 directly drives the door, each pulse is proportional to a given door travel distance. The microprocessor 14, by keeping track of the time between encoder pulses, can determine the door travel velocity. The microcontroller 14 then compares the detected velocity to a predetermined target velocity minimum limit which is less than the desired door travel velocity. The preprogrammed target velocity will be typically less than 25 percent of the maximum desired travel velocity of the door (Vmax). If the detected velocity drops below the preprogrammed target limit, then the microcontroller assumes that an external obstruction is blocking the travel of the door. If the detected decrease in velocity does not drop below the predetermined limit, then the microprocessor assumes that the change in velocity has been caused by an internal mechanical inconsistency and not an external obstruction.

The preprogrammed minimum velocity limit can be adjusted to achieve a desired level of obstruction sensitivity. Detection based on the velocity decrease is limited in that it cannot be used for the entire door travel distance. For instance, when the door travel operation is initiated, the door is in a zero velocity static position, and therefore by necessity the detected velocity is less than the minimum velocity limit. To overcome this problem, the velocity method is not implemented until a predetermined time period after the door movement operation has been initiated. Also, as the door velocity gradually decreases during a closing operation of the door, after the door has reached the ramp down position, it is quite possible that the detected velocity drops below the predetermined velocity minimal limit. To eliminate false detections of obstructions during the travel of the door between the ramp down position and the fully closed position, the velocity detection method is not implemented when the door is between these two positions.

Obstruction detection can also be based upon a sudden change in door direction. The microprocessor 14 will monitor a phase angle difference between two quadrature pulses from the encoder allowing the microcontroller 14 to determine motor rotation direction. In this manner, the microcontroller can monitor the direction of travel of the door and if this direction of travel changes without the door having reached either end of travel or without a command being received by the encoder to change direction of the door, then the microcontroller will assume external obstruction.

Friction and other internal mechanical discrepancies will not normally cause the doors to move backwards or opposite to their present direction of travel, but an external obstruction in the path of the door can. Therefore, the microcontroller can monitor the direction signals from the encoder during the door close or open operation and determine if an obstruction has occurred based on the movement of the door in an opposite direction. An obstruction that actually causes the door to move opposite to the normal direction of travel may require more force than an obstruction which simply slows the velocity of the door. Also, it is common that at the instance the door is closed fully, a bounce back may take place. Therefore, the reverse direction obstruction detection method is not implemented for the entire door travel distance. A very short distance before the doors are fully closed, the reverse obstruction method is disabled. A typical distance of door travel prior to full closure during which the reverse direction detection is not implemented is typically about ¼ of 1 inch.

With reference to the logical flow diagram of FIG. 2, the reaction of the microcontroller to the detection of a change in door velocity or direction during a door closing sequence is described. Block 20 indicates the start of door operation. Block 22 illustrates the initial check to determine if door movement has begun. If movement has begun, the direction is checked, block 24, and the location is checked to determine if the door is in its last one quarter inch of travel, block 26. If the door is within the last one quarter inch, a check is made to determine if the door is already closed, block 28, if so the operation is terminated, block 30.

If the door was not in its last one quarter inch a check is made to determine if the door has reversed direction, block 32. If the door direction has reversed, the controller instructs the door to open, block 34.

If the initial motion is not detected in block 20, then the ramp down motion, block 36, and the door velocity, block 38, are evaluated. The logical sequencing of blocks 22, 36 and 38 allow the microprocessor to evaluate each of the velocity and direction parameters in determining to reverse the direction of door movement.

The logical operation of obstruction detection and evaluation during a door opening operation parallels that described above, without the need to compensate for the final one quarter inch of travel.

The present invention does not utilize any unique hardware components in order to implement the detection methods taught herein. The methods taught herein are implemented through the microcontroller 14 and its specific programming to monitor and react to situations as described above. In this manner, the present invention eliminates electro-mechanical sensitive edges, current detectors, optical devices, slip clutches and other sensors which have been used in the prior art. Since these devices are normally unreliable, the reliance of the present invention upon the operation of microcontroller 14 is a significant improvement.

Further, because of the dual detection method utilized, one based upon a change in the door travel velocity and the other based upon a change in the door travel direction, a backup is provided to detect obstructions. This allows for detection of obstructions over a much wider range of potential obstructions to the door travel path, and also allows for less false obstruction detection.

The present invention can be implemented on any existing automatic door control mechanism which utilizes a microcontroller and a drive motor having a drive shaft monitor.

The invention now being fully described, it will be apparent to one of ordinary skill in the art that many changes and modifications can be made thereto without departing from the spirit or scope of the invention as set forth herein.

What is claimed is:

1. Motor control apparatus for an automatic door, comprising:
   motor means having a drive shaft for mechanical linkage to a door for moving the door along a travel path between opened and closed positions, said motor means having a control input for receiving a motor control signal for controlling the velocity and direction of rotation of said drive shaft;
   shaft signal means associated with said drive shaft for producing shaft signals indicative of rotational velocity and direction of rotation of said drive shaft;
   motor control means having an input and an output connected to the control input of said motor means, said motor control means producing a motor control signal at its output in response to a signal at its input;
   processor means having an input coupled for receiving the shaft signals and an output connected to the input of said motor control means, said processor means including means for measuring the shaft velocity and determining the direction of shaft rotation from the shaft signals and for comparing the measured shaft velocity with a predetermined minimum shaft velocity limit, said processor means producing a signal at its output for causing the motor control means to reverse the direction of rotation of said drive shaft when the measured rotational velocity of said drive shaft falls below the predetermined minimum shaft velocity limit.

2. Apparatus according to claim 1, wherein said processing means compares the measured shaft velocity with the predetermined minimum shaft velocity limit only after a predetermined time from initiation of shaft rotation for moving the door from one position to another.

3. Apparatus according to claim 2, wherein said processor means discontinues comparing the measured shaft velocity with the predetermined minimum shaft velocity limit near the end of the travel path of the door from the opened to the closed position and vice versa.

4. Apparatus according to claim 3, wherein changes in direction of rotation of said drive shaft correspond to changes in direction of movement of the door along it travel path, and said processor means includes means for monitoring direction of rotation of said drive shaft and for sending a signal to said motor control means to reverse direction of rotation of said drive shaft if during rotation of said drive shaft for a closing movement of the door, said drive shaft experiences a sudden reversal of rotation caused by an external obstruction in the path of the door.

5. Apparatus according to claim 4, wherein said processor means includes means for calculating distance traveled by the door from the shaft signals and means for disabling said means for sending a signal to reverse the direction of rotation of said drive shaft when the distance traveled by the door is just short of a fully closed or opened position.

6. Apparatus according to claim 1, wherein said processor means comprises a microprocessor.

* * * * *